(12) United States Patent
Johnson et al.

(10) Patent No.: US 9,757,669 B2
(45) Date of Patent: Sep. 12, 2017

(54) FILTRATION ELEMENT WITH END CAP AND FACE SEAL

(71) Applicant: Dow Global Technologies LLC, Midland, MI (US)

(72) Inventors: Jon E. Johnson, Plymouth, MN (US); Matthew D. Mittag, Eden Prairie, MN (US)

(73) Assignee: Dow Global Technologies LLC, Midland, MI (US)

( * ) Notice: Subject to any disclaimer, the term of this patent is extended or adjusted under 35 U.S.C. 154(b) by 236 days.

(21) Appl. No.: 14/438,944

(22) PCT Filed: Oct. 9, 2013

(86) PCT No.: PCT/US2013/063959
§ 371 (c)(1),
(2) Date: Apr. 28, 2015

(87) PCT Pub. No.: WO2014/066035
PCT Pub. Date: May 1, 2014

(65) Prior Publication Data
US 2015/0314224 A1 Nov. 5, 2015

Related U.S. Application Data

(60) Provisional application No. 61/718,757, filed on Oct. 26, 2012.

(51) Int. Cl.
*B01D 35/30* (2006.01)
*B01D 29/01* (2006.01)
(Continued)

(52) U.S. Cl.
CPC ............. *B01D 35/30* (2013.01); *B01D 29/01* (2013.01); *B01D 29/016* (2013.01); *B01D 29/58* (2013.01);
(Continued)

(58) Field of Classification Search
CPC .................... B01D 2201/291; B01D 2201/342
See application file for complete search history.

(56) References Cited

U.S. PATENT DOCUMENTS

| 4,016,083 A | 4/1977 | Sakaguchi et al. |
| 4,498,990 A | 2/1985 | Shaldon et al. |
| (Continued) |

FOREIGN PATENT DOCUMENTS

| DE | 29704360 | * 7/1997 | ............. B01D 27/06 |
| WO | 9718882 | 5/1997 | |

OTHER PUBLICATIONS

DE29704360—EPO Machine Translation, 2015, 2 pages.*
DE29704360—USPTO Partial Verbal Translation, 2015, 1 page.*
DE29704360—USPTO Human Translation, 2015, 9 pages.*

*Primary Examiner* — Patrick Orme
(74) *Attorney, Agent, or Firm* — Edward W. Black

(57) ABSTRACT

A filtration element including a cylindrical housing enclosing a fluid filtration media extending along an axis (X) between opposing ends with a first and second end cap located at each end, wherein each end cap includes: i) an annular surface co-extensive with the housing, and ii) outer face laying in a plane perpendicular with the axis (X). The outer face of at least one end cap comprises an annular groove. A face seal including a base is located within the annular groove. A flexible lip extends axially from the base and axially beyond the outer face of the end cap and is adapted to engage with an abutting outer face of an end cap of an adjacently positioned filtration element.

3 Claims, 4 Drawing Sheets

(51) Int. Cl.
    *B01D 29/58*     (2006.01)
    *B01D 65/00*     (2006.01)

(52) U.S. Cl.
    CPC ........ *B01D 65/00* (2013.01); *B01D 2201/291* (2013.01); *B01D 2201/342* (2013.01); *B01D 2201/40* (2013.01); *B01D 2313/04* (2013.01); *B01D 2313/20* (2013.01); *B01D 2313/21* (2013.01)

(56) References Cited

U.S. PATENT DOCUMENTS

| | | |
|---|---|---|
| 4,517,085 A | 5/1985 | Driscoll et al. |
| 5,128,037 A | 7/1992 | Pearl et al. |
| 5,851,267 A | 12/1998 | Schwartz |
| 5,851,356 A | 12/1998 | Banning et al. |
| 6,224,767 B1 | 5/2001 | Fujiwara et al. |
| 6,299,772 B1 | 10/2001 | Huschke et al. |
| 6,632,356 B2 | 10/2003 | Hallan et al. |
| 7,063,789 B2 | 6/2006 | Colby et al. |
| 7,198,719 B2 | 4/2007 | Chikura et al. |
| 7,540,956 B1 | 6/2009 | Kurth et al. |
| 8,110,016 B2 | 2/2012 | McCollam |
| 2003/0024868 A1* | 2/2003 | Hallan ................ B01D 63/106 210/321.74 |
| 2011/0042294 A1 | 2/2011 | Bonta et al. |
| 2011/0084013 A1 | 4/2011 | Lesan et al. |
| 2011/0084455 A1 | 4/2011 | Elwell et al. |
| 2011/0174713 A1 | 7/2011 | Shelby et al. |

\* cited by examiner

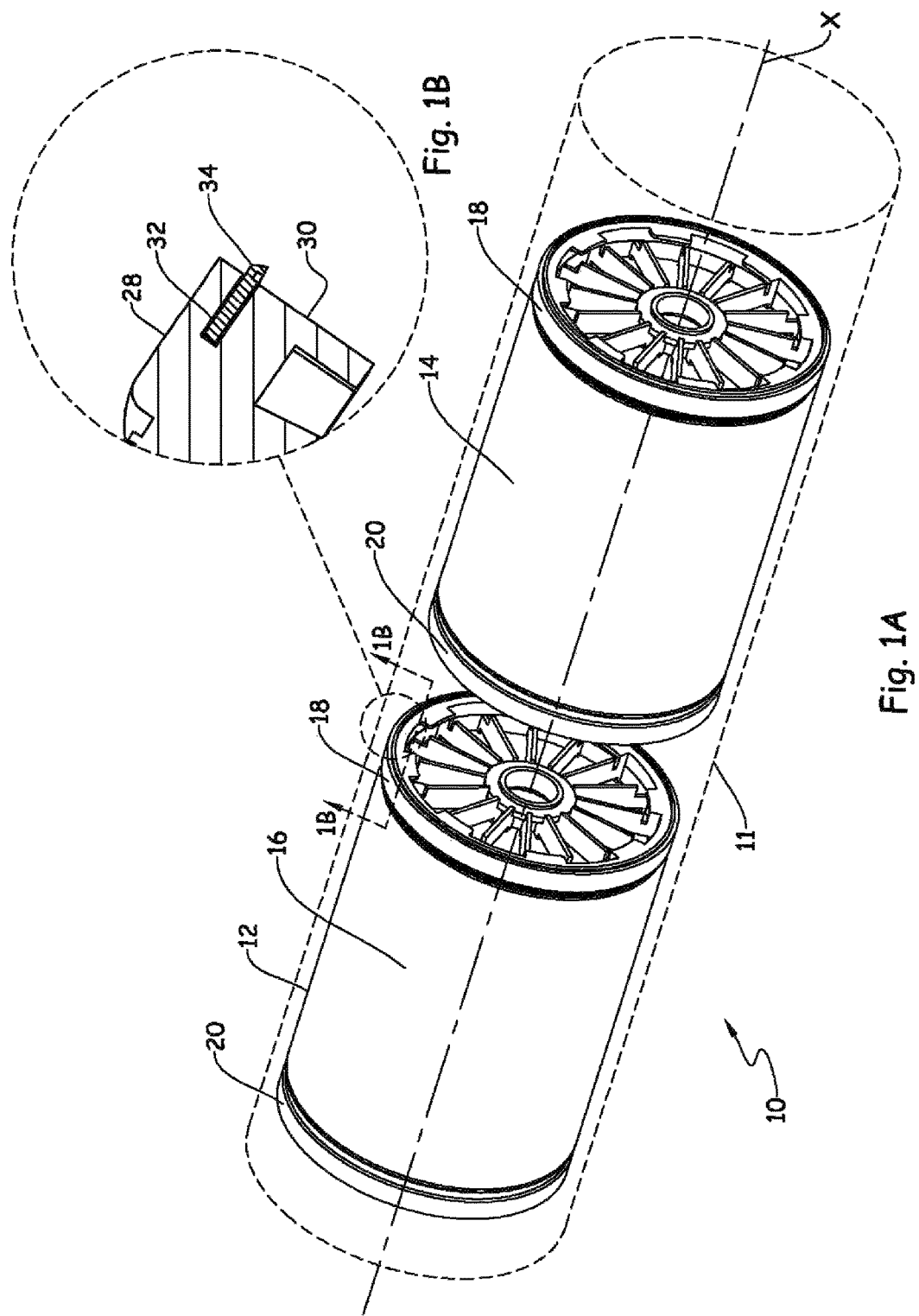

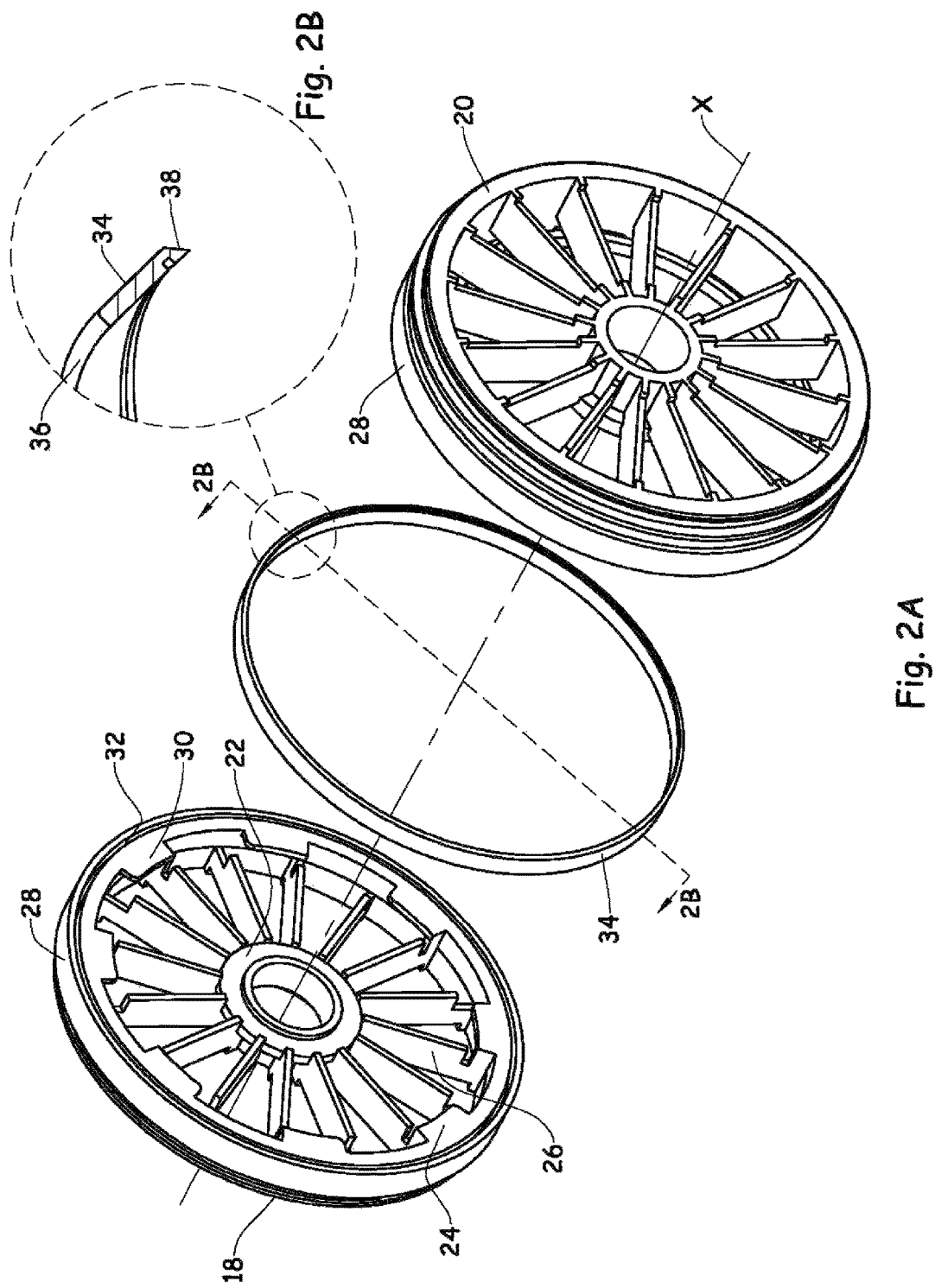

FILTRATION ELEMENT WITH END CAP AND FACE SEAL

FIELD

The present invention is directed toward filtration elements and particularly to end cap assemblies and face seals adapted for interconnecting individual filtration elements.

INTRODUCTION

End caps are commonly used to interconnect individual filtration elements in end-to-end relationship within a pressure vessel. In a typical arrangement, end caps are secured to the ends of filtration elements and are adapted to engage with an end cap of an adjacently positioned filtration element. The specific nature of engagement between end caps of adjacent filtration elements varies depending upon the specific type of element and filter assembly; however, in many applications the engagement involves perfecting a fluid seal and/or mechanical connection between adjacent elements or the surrounding pressure vessel. End caps are typically circular with an annular surface which is co-extensive with the housing of the filtration element. The end cap further includes an outer face which faces the outer face of an end cap of an adjacently positioned filtration element. Representative examples are described in U.S. Pat. Nos. 5,851,356, 6,224,767, 6,632,356, 7,063,789, 7,198,719 and US 2011/0042294.

Various types of seals may be used to prevent fluid flow between the housing of a filtration element and the pressure vessel. For example, radial brine seals (e.g. Chevron-type, O-rings, U-cup type, etc.) are located about the annular surface of the end cap and engage the inner wall of the pressure vessel. Examples are described in: U.S. Pat. Nos. 5,128,037, 6,299,772, 8,110,016 and US 2011/0042294. Unfortunately, radial seals make loading of elements difficult due to friction forces between the seal and the inner surface of the pressure vessel. In some cases, (e.g. U-cup seals), the seal actually limits the direction of element loading. Thus, in the process of loading elements within a vessel, radial seals are commonly misaligned or damaged. Moreover, radial seals tolerate little variation in vessel diameter. Rigid split ring seals (see US 2011/0174713 and US 2011/0084455) provide for lower loading friction and bi-directional loading but due to their non-compliance with the wall of the vessel, are still prone to leakage.

Face seals are an alternative type of seal. These types of internal seals are located between the outer faces of adjacently positioned filtration elements. While internal face seals offer the advantages of low loading friction and bi-directional loading, the seal requires axial compression and a gap-free connection with each end cap which must tightly engage to uniformly compress the seal. Examples are described in U.S. Pat. Nos. 6,632,356, 5,851,267, 7,063,789 and WO 97/18882. US 2011/00084013 describes a labyrinth face seal that also requires very close proximity of rigid plastic parts to perfect a seal.

New seals are sought which overcome at least some of these shortcomings, e.g. allowing for bi-direction loading, imposing lower loading friction and tolerating small gaps between filtration elements due to element misalignment, minor spacing or variations in vessel diameter.

SUMMARY

The invention includes a filtration element (12) including a cylindrical housing (16) enclosing a fluid filtration media extending along an axis (X) between opposing ends. End caps (18, 20) are located at the ends of the filtration element and each end cap includes: i) an annular surface (28) co-extensive with the housing (16), and ii) outer face (30) laying in a plane perpendicular with the axis (X). The outer face (30) of at least one end cap (18) comprises an annular groove (32). A face seal (34) including a base (36) is located within the annular groove (32). A flexible lip (38) extends axially from the base (36) and beyond the outer face (30) of the end cap (18) and is adapted to engage with an abutting outer face of an end cap (20) of an adjacently positioned filtration element (14). In another embodiment, the invention includes a filter assembly (10) comprising a first (12) and second (14) filtration element positioned in an abutting end-to-end relationship with the above-mentioned face seal (34) positioned between the elements. Many additional embodiments are described.

BRIEF DESCRIPTION OF THE DRAWINGS

The included figures illustrate several embodiments of the subject end cap assemblies, filter assemblies and selected component parts. The figures are not to scale and include idealized views to facilitate description. Where possible, like numerals have been used throughout the figures and written description to designate the same or similar features.

FIG. 1A is a perspective view of a filtration assembly including two filtration elements positioned in end-to-end relationship.

FIG. 1B is an enlarged cut out section of FIG. 1A showing a face seal located within an annular groove of an outer face of an end cap.

FIG. 2A is an exploded view showing two facing end caps and face seal.

FIG. 2B is an enlarged cut out section of FIG. 2A showing the face seal including a base portion and flexible lip.

DETAILED DESCRIPTION

Figure 3A:
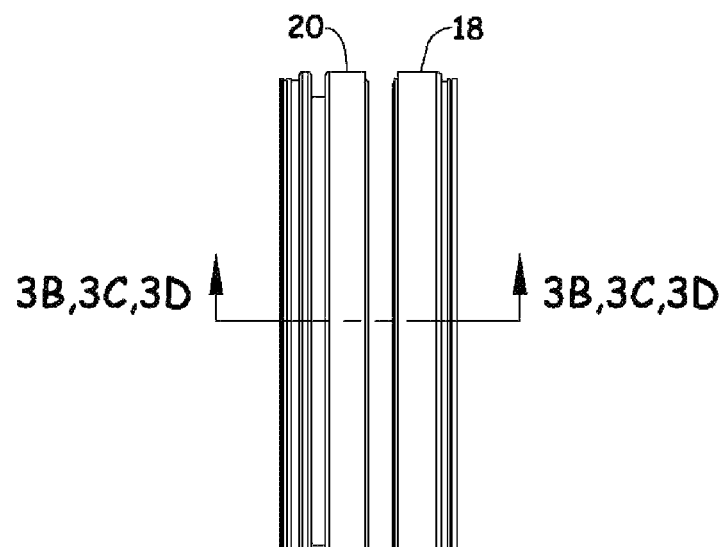
FIG. 3A is an elevation view of abutting end caps (from two co-extensively arranged filtration elements, not shown)

A filtration assembly is generally shown at 10 in FIG. 1A including a first (12) and second (14) filtration element positioned in an abutting end-to-end relationship along an axis (X) within a pressure vessel (11). Each filtration element (12, 14) includes a cylindrical housing (16) enclosing a fluid filtration media (not shown) extending along axis (X) between opposing ends. An end cap (18, 20) is secured to each end of each filtration element. As best shown in FIG. 2A, each end cap (18, 20) has a circular shape including an inner hub (22) connected to an outer hub (24) by a plurality of spokes (26). While the end caps are shown having a concentric hub and spoke design, other configurations may be used, e.g. a solid outer face include a plurality of holes for providing fluid flow such as described in U.S. Pat. No. 7,198,719.

The end caps (18, 20) may have a circumference or outer dimension slightly larger than the housing (16) but once fitted upon the element, are generally co-extensive with the housing (16). In this context, the term "co-extensive" means that the two structures share a similar planar boundary along a common axis.

Each end cap (18, 20) further includes an annular surface (28) which is co-extensive with the housing (16) of the filtration element. While not shown, the annular surface (28) may include a groove for receiving an optional radial brine seal. Each end cap (18, 20) further includes an outer face (30) laying in a plane perpendicular to the common axis (X). The outer face (30) of the end cap (18) is adapted to engage with an abutting outer face of an end cap (20) of an adjacently positioned filtration element.

As best shown in FIG. 1B, the outer face (30) of at least one end cap (18) includes an annular groove (32). A face seal (34) including a base (36) is located (e.g. interfacially fit) within the annular groove (34). In a preferred embodiment, the annular groove (34) and base (36) have corresponding rectangular cross sections. As best shown in FIG. 2B, the face seal (36) further includes a flexible lip (38) that extends axially from the base (36) and projects beyond the outer face (30); however, the lip (38) does not extend radially beyond the annular surface (28). In preferred embodiments, the lip (38) extends at least 2 mm (e.g. 2-10 mm, more preferably 3-8 mm) axially from the base (36).

In a preferred embodiment, the base (36) and lip (38) of the face seal (34) comprise an integral elastomeric structure, e.g. a pre-formed from an elastomeric material such as an ethylene-propylene diene M-class rubber (EPDM), neoprene, buna rubbers, ethylene-vinyl acetate (EVA), polyethylene, polypropylene, polyurethane and silicone materials. Preferred materials have a Type A durometer of from 50-100 as measured by ASTM D2240-05 Type A. An example of a preferred material includes EPDM having a Type A durometer of 60-90. Preferred elastomeric materials also have a tensile strength of from about 5-40 MPa as measured by ASTM D 412-06; an elongation of from about 100-1000%, as measured by ASTM D 412-06; and a modulus (100%) of from about 0.5-5 MPa as measured by ASTM D 412-06. Depending upon the specific application of the filter assembly, the seal may need to be made from governmental approved materials, such as peroxide cured, food grade EPDM rubber. The face seal (34) is preferably ring-shaped, i.e. forms a continuous loop or ring of material.

Figure 3B:
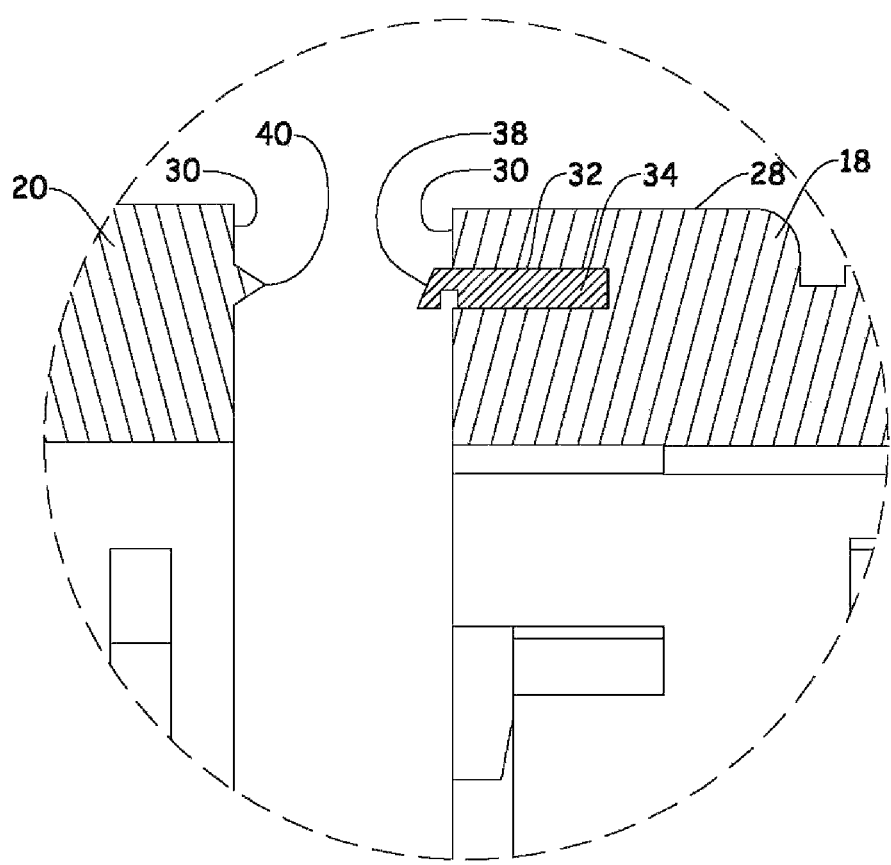
FIGS. 3B, C and D are enlarged cut away views of the end caps of FIG. 3A showing face seal in different stages of engagement.
Figure 3C:
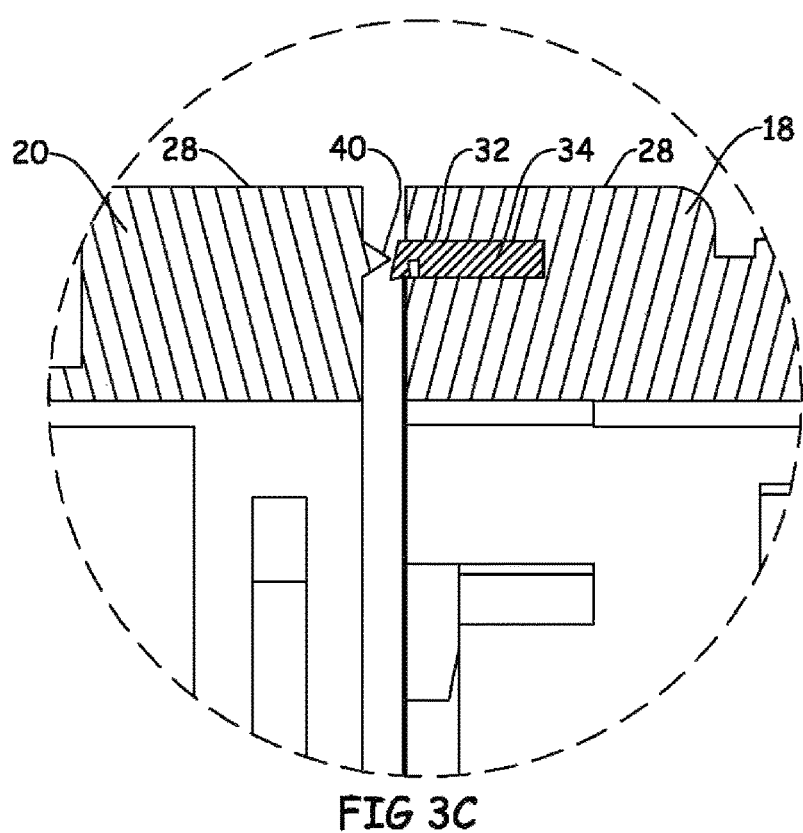
Figure 3D:
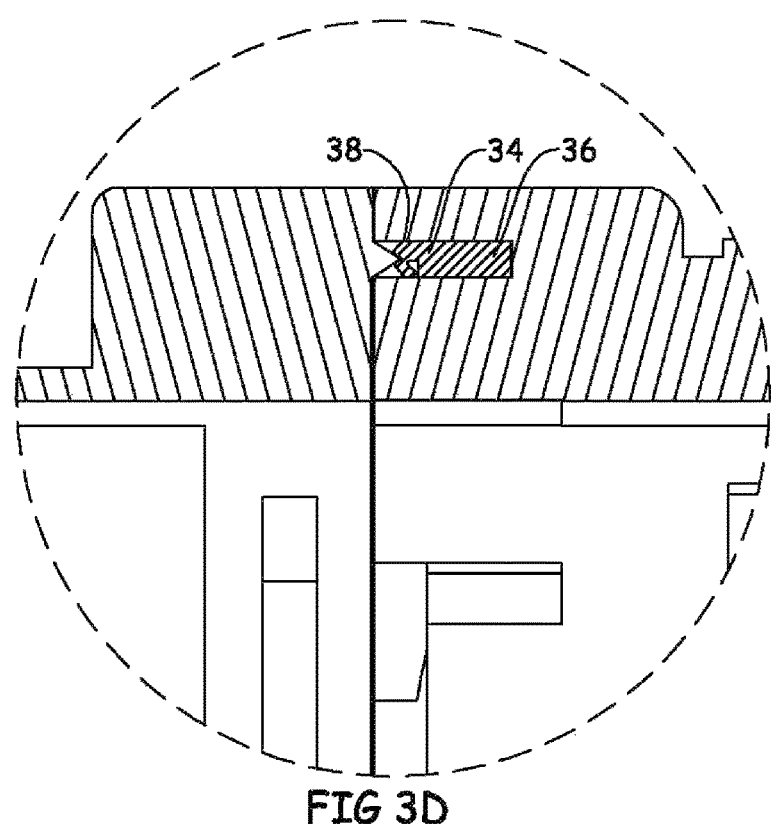

During assembly, a plurality of filtration elements (12, 14) are aligned in an end-to-end relationship, e.g. within a common pressure vessel (11). The design and construction of the pressure vessel is not particularly limited but preferably includes at least one fluid inlet and outlet. FIG. 3A-D illustrate two abutting end caps (18, 20) of two filtration elements (not shown) aligned in an end-to-end relationship. The flexible lip (38) of the face seal (34) that extends axially from the first end cap (18) makes sealing contact with the outer face (30) of an adjacently positioned end cap (20). As the filtration elements (12, 14) are urged together in end-to-end relationship (see FIGS. 3C and 3D), the flexible lip (38) axially flexes toward the base (36). In a preferred embodiment, the outer face (30) of an end cap (20) of the second filtration element (14) includes an axially extending annular ridge (40) aligned with the annual groove (34) of the abutting end cap (18) of the first filtration element (12) such that the annular ridge (40) engages with, and forces the lip (38) of the face seal (34) to axially flex inward toward the base (36), e.g. so that lip (38) and base (36) form a structure having a substantially rectangular cross section.

While not a required aspect of the invention, preferred embodiments of the invention include end caps which include a locking structure for preventing relative axial movement between engaged end caps. Such a locking structure between end caps may be engaged by aligning adjacent end caps so that one or more projections or catches extending radially inward from the inside of the outer hub of one end cap enter corresponding receptacles arranged about the outer hub of the facing end cap. The end caps are then engaged by rotating one end cap relative to the other until the projections or "catches" contact or "hook" with a corresponding structure of the receptacle. This type of locking structure is described in U.S. Pat. No. 6,632,356.

The first end cap may additionally, or alternatively includes a depressible tab located on the annular surface which is movable in a radial direction between a first (e.g. extended) and second (e.g. depressed) position. The second end cap may include a slot, (preferably a plurality of slots), located on its annular surface that is adapted for receiving the tab of the first end cap as the first and second end caps are engaged such that relative rotational movement between the first and second end caps is prevented while the tab is in an extended position within the slot, but where such relative rotational movement is permitted when the tab is in a depressed position. This type of locking structure is described in US 2011/0042294. When used in combination with the locking structures of U.S. Pat. No. 6,632,356, the tab/slot feature can selectively prevent both relative axial and rotational motion between end caps (and corresponding filtration elements). That is, once engaged, the "tab/slot" feature selectively prevents relative rotational movement between end caps, which in turn maintains the locking structure in full engagement so that relative axial movement between the end caps is also prevented. Thus, end caps (and corresponding filtration elements) can be selectively disengaged and disconnected by depressing the tab located on the annular surface of the end cap and rotating one end cap relative to the other. This combination of features is also helpful as it provides a clearer indication of when the end caps are fully engaged and interconnected. Moreover, the tab/slot feature prevents unintended rotation between filtrations elements which may otherwise occur during installation within a pressure vessel or during operation.

For purposes of the present invention, the type of fluid filtration media within the filtration element is not particularly limited. The selection of filtration media will typically depend upon the specific application, feed source, solute, and foulants. Representative examples include membrane-based media such as composite flat sheet, hollow fiber and tubular membranes which may be used in a wide variety of applications including: reverse osmosis (RO), forward osmosis (FO) nanofiltration (NF), ultrafiltration (UF) and microfiltration (MF). Other media examples include granular, powder or particle form adsorbents, ion exchange and chelating resins. Spiral wound elements are one preferred type of filtration element. Such elements are typically formed by winding one or more membrane envelopes and optional feed channel spacer sheet(s) ("feed spacers") about a permeate collection tube. Each membrane envelope preferably comprises two substantially rectangular membrane sheets surrounding a permeate channel spacer sheet ("permeate spacer"). This sandwich-type structure is secured together, e.g. by sealant, along three edges while the fourth edge abuts the permeate collection tube so that the permeate spacer is in fluid contact with openings passing through the permeate collection tube. The housing may be constructed from a variety of materials including stainless steel, tape and PVC material; however the most common module housing material is made from fiber reinforced plastics, e.g. long glass fibers coated with a thermoplastic or thermoset resin. During module fabrication, long glass fibers are wound about the partially constructed module and resin (e.g. liquid epoxy) is applied and hardened. The ends of elements are fitted with an end cap which may optionally serve as an anti-telescoping device designed to prevent membrane envelopes from shifting under the pressure differential between the inlet and outlet ends of the element.

Many embodiments of the invention have been described and in some instances certain embodiments, selections, ranges, constituents, or other features have been characterized as being "preferred". Such designations of "preferred" features should in no way be interpreted as an essential or critical aspect of the invention.

The entire content of each of the aforementioned patents and patent applications are incorporated herein by reference.

The invention claimed is:

1. A filter assembly (10) comprising a first (12) and second (14) spiral wound filtration element positioned in an abutting end-to-end relationship along an axis (X), wherein each filtration element comprises:
   a cylindrical housing (16) enclosing a fluid filtration media and extending along the axis (X) between opposing ends,
   an end cap (18, 20) located at each end of the filtration element and comprising: i) an annular surface (28) co-extensive with the housing (16), and ii) outer face (30) laying in a plane perpendicular with the axis (X),
   wherein the outer face (30) of at least one end cap (18) of the first filtration element (12) comprises an annular groove (32), and a face seal (34) comprising: i) a base (36) located within the annular groove, and ii) a flexible lip (38) extending axially from the base (36) beyond the outer face (30),
   wherein the flexible lip (38) is in sealing contact with the outer face (30) of an end cap (20) of the second filtration element (14) and
   wherein an outer face (30) of an end cap (20) of the second filtration element (14) comprises an axially extending annular ridge (40) aligned with the annual groove (28) of the end cap (18) of the first filtration element (12) wherein the annular ridge (40) flexes the lip (38) axially toward the base (36) of the face seal (34).

2. The filter assembly (10) of claim 1 wherein each end cap (18, 20) comprises an inner and outer hub connected by a plurality of spokes.

3. The filter assembly (10) of claim 1 wherein the end caps of the abutting first and second filtration elements comprise a locking structure for preventing relative axial movement between the first and second filtration elements once engaged, wherein the locking structure comprises a plurality of projections extending radially inward from the inside of outer hub of one end cap, and a plurality of corresponding receptacles on the other end cap which are adapted for receiving the projections, wherein the locking structure is reversibly engaged by abutting the end caps of the first and second filtration elements and rotating one element relative to the other.

* * * * *